Figure 1:
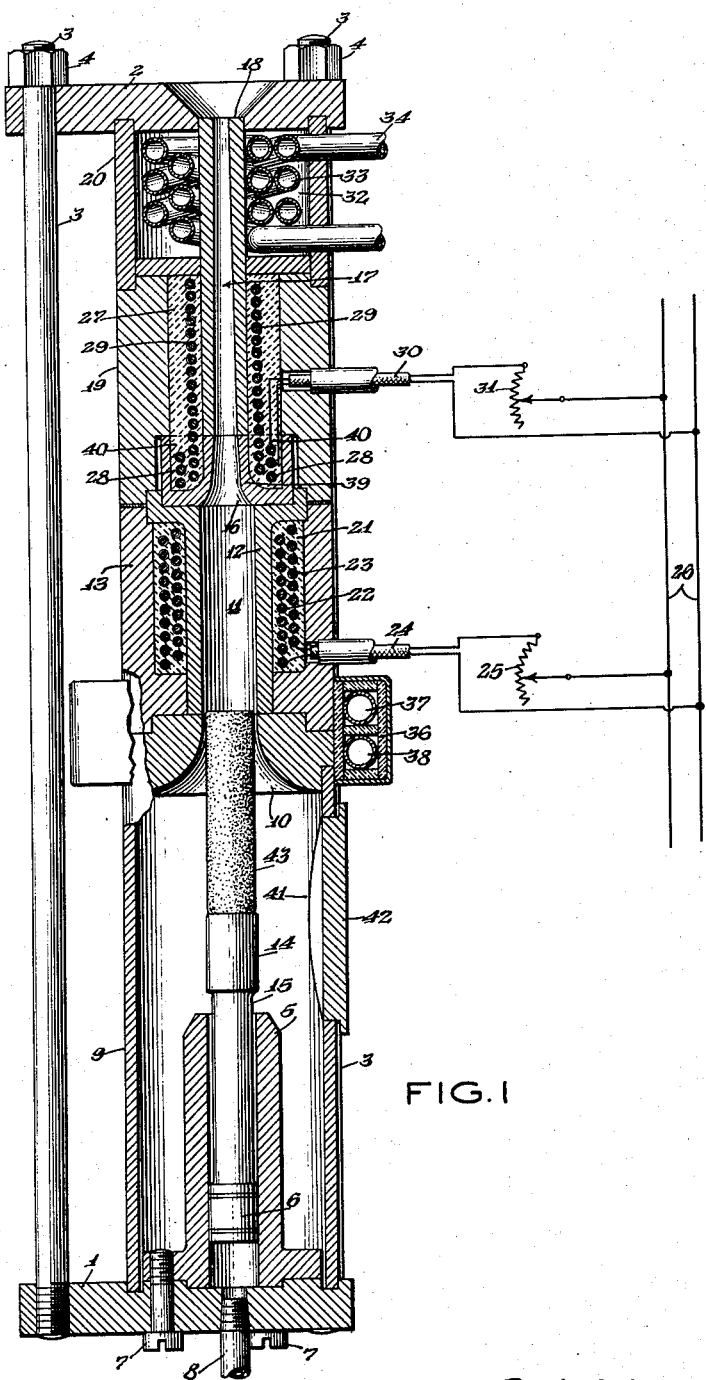

Dec. 17, 1940.   P. SCHWARZKOPF   2,225,424
MANUFACTURE OF ALLOYS, IN PARTICULAR STEEL ALLOYS
Filed April 10, 1940    2 Sheets-Sheet 2

INVENTOR.
Paul Schwarzkopf
BY
ATTORNEY.

Patented Dec. 17, 1940

2,225,424

UNITED STATES PATENT OFFICE 2,225,424

MANUFACTURE OF ALLOYS, IN PARTICULAR STEEL ALLOYS

Paul Schwarzkopf, Yonkers, N. Y., assignor to American Electro Metal Corporation, Yonkers, N. Y., a corporation of Maryland Application April 10, 1940, Serial No. 328,832

9 Claims. (Cl. 75—122)

This invention relates to a method of manufacturing alloys, in particular steel alloys.

This application is a continuation in part of my copending application Ser. No. 287,905, filed August 2, 1939, now Patent #2,205,865.

I suggested in that application a manufacture of alloys, particularly steel alloys, in such a way that the components, or the base metal and additions in the completed alloy are present in exact proportions even if the amount of some of the components or additions is very small, i. e. a few per cent or fractions of one per cent only.

Another object of the invention disclosed in my copending application was to ensure uniform distribution in finely divided state of the components and additions, respectively, in the completed alloy. In particular, a mutual permeation or solution of some or all of the components of the alloy, or of the additions in the base metal, was secured.

According to the previous suggestion in my above mentioned copending application, I subjected a finely divided and uniformly distributed mixture of the components of the alloy, or of a base metal and the desired additions, to compacting under high pressure in an extrusion press, and thereafter successive portions of the compacted mass, preferably while still under pressure, to a local heat treatment resulting in substantially instantaneous melting of one, several or all of the components, or of the base and, if desired, some or all additions contained in such portion. Thereby mutual permeation of all the components or of selected ones, or a solution thereof was attained. The instantaneously melted portion of the mass or strand was immediately thereafter solidified by cooling so as to avoid having the molten components react upon each other and thereby to change substantially their chemical or crystalline structure, and at the same time to avoid precipitation or segregation liable to disturb the initial uniform distribution.

The invention disclosed in my copending application mentioned above was based on the consideration that instantaneous melting results in immediate mutual permeation, i. e. diffusion or complete solution if the comminuted particles of the mixture are of finest size and in most intimate contact with each other. In order to achieve such intimate contact, I suggested to exert a high or excessive pressure upon the mixture before being caused to melt locally and substantially instantaneously, and in order to bring about this pressure upon the mixture in an economic process, I suggested to extrude the mixture in such a way that a high degree of reduction in area results. In order to increase economy, I also suggested to heat the initial mixture in the extrusion press before being extruded, but only to a temperature at which all the components are still solid and not yet plastic. This was based on the consideration that if the mixture or some components thereof were plastic or at a temperature where they could flow, a relatively low pressure would suffice for moving the mixture through the extrusion aperture of the press; such a low pressure was deemed insufficient for bringing the particles close enough to each other so as to secure their immediate permeation when thereafter melted instantaneously and locally.

I now found that the object of my invention as disclosed in my copending application can also be accomplished if the mixture passing the smallest cross section (aperture) of the extrusion press is heated above a temperature corresponding to the still solid state of all its components. In other words, according to the discovery underlying my present invention, the mixture undergoing extrusion is heated above that temperature and even melted instantaneously just when passing the smallest area in the outlet or aperture of the extrusion press through which the mixture is moved, provided that sufficiently high or excessive pressure is exerted upon it which is produced by other means acting upon the extruded mass or strand.

According to my present invention the confined space into which successive portions of the mass are extruded is shaped so that those portions are highly compressed and their travel through that space obstructed. Those portions of the mass are kept at a temperature considerably below melting and high sintering temperature so that they are cooled and solidify substantially instantaneously though remaining still hot and preferably above the transformation temperature, if any, of its structure. Thus the solidified portions of the mass travelling through the confined space form a sort of solid "stopper" which due to the shape of the confined space can be pushed forward and pass it only under the action of high pressure. This pressure is exerted upon this stopper only through the molten portions of the mass in the nozzle as well as the mass still in the press, and thus the desired compacting of the portions of the mass passing the nozzle, though being melted at least partially, is attained.

Whereas according to my copending application mentioned above, the high pressure in the mass undergoing extrusion is created by the resistance of the still solid mass against being pressed through the nozzle, according to my present invention the high compacting pressure is created in part by the cooperation of the means acting upon the mass in the extrusion press and the nozzle and in part by the "back-pressure" or "reaction" from the "stopper"

formed by the solidified mass in the confined space due to the shape of the latter.

In particular, the confined space consists of a channel which is tapered, i. e. reducing in area, towards its outlet over its entire length or part thereof preferably near the nozzle. This tapered channel or section thereof will compress, i. e. reduce the area, the "stopper" travelling through it, thereby obstruct its travel and cause by mechanical reaction the high pressure within the molten and other mass behind it in the nozzle and the extrusion press.

Thus it is possible to heat the mixture in the extrusion press near its aperture to a temperature at which the mixture or part of it is even plastic and capable to flow, and the temperature of the mixture passing the smallest cross section of the extrusion press, i. e. its aperture, can be even as high as the melting temperature of the mixture or of desired components thereof. Nevertheless, the particles just undergoing melting will be pressed as closely as possible to each other due to the "back-pressure" exerted upon the mass by the stopper formed by solidified material in the adjoining tapered or otherwise suitably shaped confined space, and mutual and thorough permeation or solid solution of the instantaneously melted components is ensured.

It is evident that such a process is still more economical than that disclosed in my copending application. Plastic or molten material flows more easily through an aperture of an extrusion press than a still solid powdery mass, and the wear of the nozzle of the extrusion press will be considerably reduced. Furthermore, since the mixture passes the smallest area of the extrusion press just when melted, or at least heated so far that it is plastic, the compacting action will be more effective because plastic or even just melting particles will contact each other over a greater part of their surface than still solid though highly compressed particles. In other words, the particles of a plastic or just melting mixture are capable to adjust their shapes to each other completely while solid particles under equally high pressure cannot do so. By such adjustment of the shapes of the particles to each other, their contacting surfaces are increased to the possible maximum and the pores of the mixture are completely filled and closed and immediate and permeation, i. e. substantial diffusion or solution is secured.

Thus it is an object of the invention to improve a method of manufacturing alloys, in particular steel alloys, by highly compressing a finely comminuted mixture of the components, or of a base and additions, and instantaneously and locally melting portions of the highly compacted mass while under highest pressure prevailing during extrusion.

It is another object of the invention to increase the economy of such a process.

It is still another object of the invention to reduce the wear of an extrusion press, and particularly its extrusion aperture or nozzle, used for the purpose of my invention.

It is still another object of the invention to improve the completeness and velocity of mutual permeation, i. e. diffusion or dissolution of components of a mixture, or a base and additions, while being extruded and heat treated.

It is a further object of the invention to secure a most uniform distribution of the components in the completed alloy, and to retain their initial uniform distribution and chemical composition.

It is still a further object of the invention to manufacture alloys, in particular steel alloys, from powdery initial mixtures by highly compressing them in an extrusion press and instantaneously and locally melting successive highly compressed portions thereof while they are undergoing extrusion.

Figure 2:
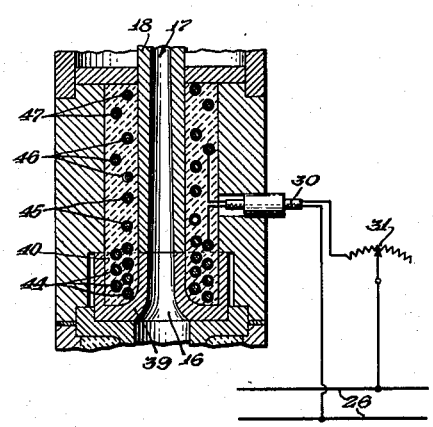
Figure 3:
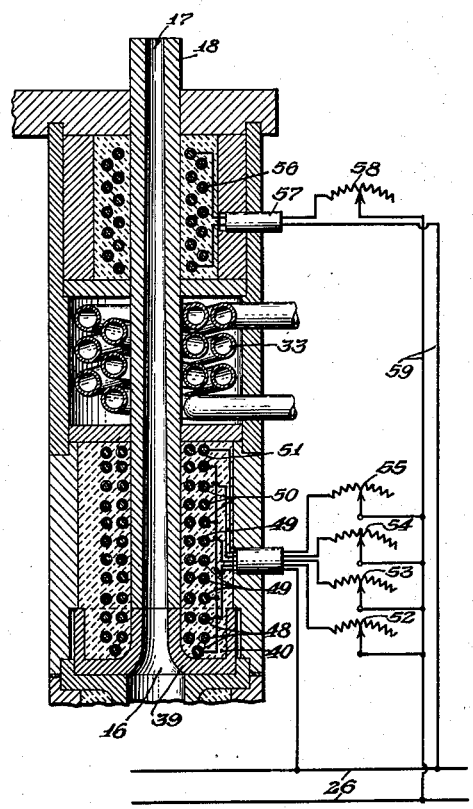
Figure 4:
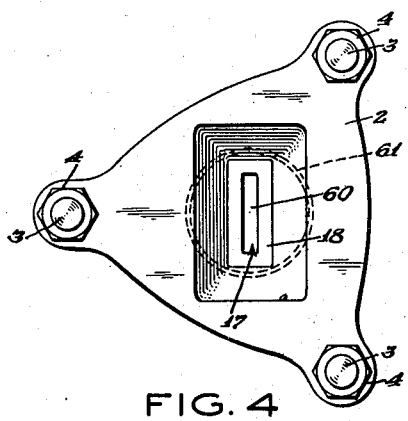
Figure 5:
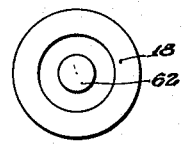

These and other objects of the invention will be more clearly understood when the specification proceeds with reference to the drawings in which Fig. 1 shows a cross section through an extrusion press used for the purpose of this invention, Figs. 2 and 3 show in a similar way other features of portions of the confined space or channel into which the initial mixture or mass is extruded, and Figs. 4 and 5 top views of different shapes and arrangements of the uppermost portion of that channel.

It is to be understood that the invention is not limited to any of the exemplifications given below but to be derived in its broadest aspect from the appended claims.

Referring to Fig. 1, an extrusion press is shown comprising a base 1 and a top member 2 connected by a suitable number of bolts 3 which may be screwed into the base member and provided with nuts 4 at the upper ends for pressing the top member towards the base.

In a cylinder 5 a piston 6 is suitably arranged. Cylinder 5 is liquid-tightly inserted into a groove of base 1 and secured thereto by screws 7.

Water under suitably high pressure can be introduced below piston 6 through pipe 8. A shell or like support 9 spacedly surrounds cylinder 5 and is mounted on base 1. On top of shell 9 a support 10 for a chamber 11 is arranged which substantially consists of a cylindrical lining 12 of metal, such as steel, and a mantle 13. A plunger 14 snugly fits lining 12 and is connected with piston 6 by rod 15.

A nozzle 16 of material of great mechanical strength and heat resistance is mounted on top of lining 12 and opens into a channel 17 formed by a tube 18 of heat resistant steel alloy, tungsten or molybdenum, and which tapers over its entire length or part of it towards its upper end. This tube may also consist of a refractory lining not reacting with the alloy to be formed therein at the prevailing temperature, such as an alumina, zirconia, or magnesia composition which is reenforced on the outside by a mantle of steel or other mechanically strong alloy. Tube 18 is surrounded by cylindrical mantle pieces 19 and 20.

Between lining 12 and mantle 13 an annular space 21 is left to receive one or more helically wound coils 22 and 23 preferably embedded in powdery refractory material tightly filling space 21 around the coils. A cable 24 passes through mantle 13 and its conductors are connected with the coils 22 and 23 and through rheostat 25 with a suitable source of electrical current 26 which may be direct or alternating and specifically a high frequency current.

It is understood that the heating coils 22, 23 are made and arranged in any way well known in the art for electrically producing heat in an economical way. The amount of current applied to the coils can be regulated by rheostat 25. It is understood that any other means known in the art, such as variable transformers, if alternating or high frequency current is used, may be used instead.

Between tube 18 and mantle piece 19 an annular space 27 is left, and the shaped piece 39 forming nozzle 16 is also provided with an annular hollow space 40 forming a continuation of annular space 27. In the spaces 27 and 40 a number of coils 28, 29 is arranged which are connected through cable 30 and rheostat 31 with the same source of electrical current 26 as used for heating coils 22, 23, or another source of electrical current as the case may be.

Between tube 18 and mantle piece 20 another annular space 32 is left in which a hollow coil 33 is arranged in one or more coaxial rows. A cooling medium, such as faucet water or even refrigerated water, can be passed through pipe 34 into coil 33.

A jacket 36 may also be provided around support 10 and the lower portion of mantle 13 and be passed by a number of pipes 37, 38 into which a cooling medium can be released by pipes (not shown).

A feeding opening 41 is provided in shell 9 and suitably closed by a removable cover 42.

For the use of the vertical extrusion press, illustrated by way of example in Fig. 1, and which, of course, may be arranged in any other position, such as a horizontal one, a preliminary body 43 is to be prepared which can be inserted into the press through aperture 41 after removal of cover 42 and positioned on top of plunger 14, as shown in Fig. 1. Such body consists of the components, or the base and additions, desired for the alloy to be manufactured.

The components, or the base and additions, are first comminuted as finely as possible, preferably to a particle size corresponding to an average diameter of about 6 to 30 microns. Preferably the components are comminuted separately and thereafter admixed in the exact proportion in which they are to be present in the completed alloy. The components may also be mixed first in such ratio and the mixture then be comminuted to the desired particle size. Any combination of these two procedures is applicable.

Some desirable elements for alloys, particularly steel alloys, such as metallic tungsten or molybdenum, can be obtained as finest powders from their oxides available in the market.

If a tungsten, molybdenum, cobalt, nickel or silicon containing steel alloy is to be manufactured, powders of tungsten etc. are admixed in desired ratio to iron powder which is obtained e. g. by mechanical comminution or in the form of finest powder by chemical conversion of iron carbonyles. The initial mixture is thereafter pressed and preferably heated to form a coherent body of desired shape and size, e. g. a cylindrical body 43, fitting into cylinder 11. The pressure applied may be very high, up to several hundred or even a few thousand kilograms per square centimeter. The heating temperature should not exceed presintering temperature of the mixture for reasons of economy and so as to avoid chemical reactions particularly in open air. The preliminary body thus obtained contains the elements, or base and additions, in finest and uniform distribution.

If a steel is to be manufactured containing a small fraction of one per cent of carbon, powdery iron and carbon of like type, such as lampblack, are admixed in the desired ratio and transformed into a preliminary body 43. However, it is also possible to admix powdery iron with iron carbide in an amount to produce a steel of exactly the desired carbon content. In such case the invention ensures that iron carbide, though in minute amount, is present in the iron base and that the latter does not contain dissolved uncombined carbon besides carbide in uncontrollable amount.

If alloys for other purposes are to be manufactured, such as cobalt-nickel-iron alloys, e. g. in proportions to secure a temperature expansion of the alloy substantially equalling that of certain glass, purest metals can be comminuted and admixed in desired ratio and shaped into a preliminary body 43.

If an alloy suitable for permanent magnets of great coercive force and remanent magnetism is desired, the components are selected from a group comprising nickel, cobalt, copper and/or iron, furthermore from another group comprising titanium, aluminum, beryllium, magnesium, chromium and/or vanadium in desired proportions. In particular, ratios can be selected resulting in precipitation hardening, if such hardening is desired, or resulting in a complete solid solution. The selected elements are comminuted and thoroughly admixed and thereafter shaped into a preliminary body 43. Traces of carbon may be added either in form of iron carbide or as lampblack.

If a nickel-aluminum alloy is desired, even with only a few per cent of aluminum, the elements in desired ratio can be comminuted and admixed and shaped into a preliminary body 43.

If an alloy for electrical contacts, particularly welding electrodes is desired, consisting of elements selected from copper, cadmium, chromium, boron, magnesium, beryllium, nickel and iron, again the elements selected in desired ratio, and some of them in an amount of a few per cent or even a fraction of one percent, are comminuted and admixed and shaped into a preliminary body 43.

If an alloy resistant against heat and/or corrosion, such as rusting, is desired, again iron, chromium, nickel and carbon in desired proportions are comminuted, uniformly admixed and shaped into a preliminary body 43.

If an antifriction metal is desired comprising about 5% to 20% graphite admixed with a base, such as iron or an alloy of components selected e. g. from tin, zinc, copper, silicon, lead and iron, the element or elements to form the base are comminuted, intimately admixed with graphite and then shaped into a preliminary body 43.

If a hard metal is to be produced comprising one or more hard and refractory carbides, such as tungsten carbide, tantalum carbide and titanium carbide, and a metallic binder preferably of the iron group, the carbides and binding metal are comminuted, thereafter admixed in desired proportion and compacted into a preliminary body 43. In the subsequent treatment (hereafter described) the metallic binder is melted or semimelted, and upon solidification a strand or bar of hard metal is formed which can be subdivided into pieces of desired size. Hard metals containing relatively large amounts of metallic binder (about 10% to 45%) can be manufactured advantageously in this way. The completed strand or bar of hard metal can be sliced or cut e. g. with tools having diamonds embedded in a hard metal, heavy metal or other suitable base.

Thus the process according to this invention is of great advantage whenever alloys are to be made forming at least in part true solid solutions, but are difficult to manufacture either because the components when melted react upon each other and change their chemical structure, or fluxes are to be used in order to promote melting on a commercial basis, or relatively small amounts of one or more additions are desired, or extreme purity of the alloy is required, or absorption of gases, such as oxygen and nitrogen, has to be avoided without the addition of reducing and purifying agents, or oxidation and thereby evaporation of one or the other component particularly of those present in small amount is to be avoided, or defined chemical compounds are to be retained or produced, or recrystallization or collective crystallization to be avoided, or a certain crystalline structure to be arrived at with certainty. These advantages of my invention obviously apply also to a powdery initial material consisting of a single element.

Experience has shown that it also suffices to melt or semi-melt a single component of a mixture in order to secure dissolution therein of a still solid other component, particularly if the latter is present in small amount.

In comminuting and admixing the components or the base and additions, and compacting them into an initial body 43, introduction of impurities, change of proportions and chemical and crystalline structure, and other disadvantages enumerated above by way of example, can be successfully avoided.

If a horizontal extrusion press or a vertical extrusion press, in which plunger 14 works downwardly, is used, the mixture can be introduced into cylinder 11 even without being compacted into a coherent initial or preliminary body 43.

After the initial mixture or body 43 has been introduced into cylinder 11, a fluid under pressure is admitted through pipe 8 below piston 6 into cylinder 5, and the plunger 14 raised and pressed into cylinder 11. The pressure exerted in the press may amount up to about 10,000 to 15,000 kilograms per square centimeter, and higher.

The initial body 43 may be inserted when still warm from a foregoing fritting process, if applied.

Chamber 11 may also be heated externally, if desired, in a controlled way so that the temperature of the mixture or initial body contained therein is raised to a degree below the temperature at which any component becomes plastic or liable to flow under pressure. The mixture or body is then pressed into nozzle 16 and its area reduced considerably, preferably by 50% to 75% and more, resulting in highly compacting the mixture or body. Simultaneously it is heated by the action of the coils arranged within space 40 of nozzle 16 so that the components which are desired to melt, or almost to melt, are instantaneously heated to a corresponding temperature, and are at that temperature when the mass or strand formed by the nozzle passes the smallest cross section or area of the latter.

In order to arrive at true solutions it is not always necessary to completely melt the components but that often a state between high sintering and melting also suffices to cause substantial mutual permeation, i. e. diffusion or interchange of atoms of the components.

An element intended to be sintered at high sintering temperature is highly plastic but not yet liquid; in other words a pile of the powdered element positioned on a support and heated to high sintering temperature will shrink and its particles adjust their shape to each other, but not yet liquefy and flow off. If the same powder is heated to melting temperature, it liquefies entirely, the individual particles lose their shape and flow into each other, and the liquefied pile flows literally over the support.

The temperature I am imparting to the elements intended to form solid solutions within nozzle 16 are therefore above high sintering temperature as just defined, but below melting temperature and called henceforth and in the appended claims "semi-melting temperature", but may equal, if desired, complete melting or even higher temperature. The heat is applied instantaneously to the successive portions of the highly compressed mass or strand passing nozzle 16. As soon as the portions travel farther and enter the confined space or channel 17, the heat applied is reduced due to the fact that only one row of coils 29 is heating the channel. If two rows are applied, the individual windings of the coils are to be arranged more distant from each other, or the cross section of the conductors is to be reduced, or any other means may be applied suitable to reduce the heat conveyed through the walls of tube 18 to the mass or strand travelling therethrough. Consequently, the portions of the strand entering in succession channel 17 are cooling down and thereby change their state of aggregation, i. e. become plastic instead of molten and soon solidify although they are still hot. Channel 17, however, is tapered upwardly and consequently compresses the plastic and solidified portions of the mass or strand travelling therethrough, thereby exerting considerable resistance to the travel. By properly adjusting the temperatures to which channel 17 is heated, and also the reduction in area of the tapered channel, any desired degree of pressure can thus be exerted upon the mass or strand and consequently resistance or obstruction to its movement ahead, wherefrom any desired pressure results also upon that portion of the mass or strand just passing nozzle 16 and being heated above high sintering temperature.

Owing to this high pressure upon the mass in the nozzle, the particles just melting are tightly pressed together and their mutual permeation is assisted. In view of the fact that relatively small portions of the strand are instantaneously heated and cooled immediately thereafter, no opportunity is given the components of the mixture to segregate.

Due to the fact that the mixture undergoing this heat treatment under pressure is entirely enclosed by the walls 39 and 18, access of air, oxygen and nitrogen is prevented, and no chemical conversion due to the presence of such gases can occur. No fluxing or reducing agents are necessary since the mixture is composed exactly of the elements of which the final alloy is to consist in their exact ratio and chemical constitution.

None of the components is given any possibility either to evaporate and to escape the mixture since the mixture heated within nozzle 16 is entirely enclosed, and if vapors are formed in spite of the high pressure prevailing in that zone, they are condensed again upon immediate subsequent cooling.

Heating of the mass or strand travelling through channel 17 opposite coils 29 is controlled by rheostat 31 in such a way that the passing plastified or solidified portions of the mass or strand cool rapidly or slowly, as desired, e. g.

below a transformation point of the alloy, if any, and until the mass is completely solidified. Thereafter the mass enters that portion of tube 18 which is surrounded by cooling coils 33 and final cooling is accomplished.

Due to the fact that the mass passing nozzle 16 is not necessarily to be melted entirely or partially but heating it to temperatures above sintering and below melting temperature suffices, great advantages are achieved with respect to the possible composition of wall 39 confining the hottest zone of the apparatus. If e. g. mainly metal of the iron group is treated in the apparatus, wall 39 can be made of an alloy the melting point of which is a few hundred degrees C. higher than the temperature to which the mass passing the nozzle is to be heated.

Since the high sintering temperature of metals lies about 10% below their melting point, and iron group metals melt between about 1450° C. and 1520° C., it is evident that according to the present invention minimum temperatures of about 1350° C. to 1400° C. will suffice for changing the solid state of aggregation of those metals into a highly plastic one.

As mentioned above the heating coils 28, 29 can be arranged within space 27 in any suitable way to control cooling of the mass passing through the confined space or channel 17.

Chromium-molybdenum or chromium-tungsten alloys containing less than about 40% chromium, molybdenum and tungsten alone or any of their alloys, and also so-called hard metals containing refractory carbides, such as tungsten carbide, molybdenum carbide, titanium carbide and a minor amount of a metallic binder, such as molybdenum, tungsten, chromium and possibly an admixture of cobalt, are suitable for walls 39 and 18; the hard metals may be of the sintered or cast type.

Fig. 2 shows schematically an arrangement of the heating coils to create a highly heated zone within nozzle 16 and a considerably cooler zone in front of it, while the subsequent zones are such as to slowly cool the solidified mass travelling on through channel 17. To this effect coils 44 are arranged in two rows and close windings in space 40 surrounding nozzle 16, creating the hottest zone of the entire apparatus within the nozzle; the next following zone is heated by a few coils 45 only, effecting a rapid cooling and solidification of the mass passing that zone. The next following coils 46 are arranged so as to effect a still cooler but longer zone, while the uppermost zone, which is the coolest, is heated by a few coils 47 only.

Fig. 3 shows schematically another arrangement of the heating coils and also of the confined space into which the mass is pressed. Here the coils are arranged in groups 48, 49, 50 and 51, and each group is connected over rheostats 52, 53, 54 and 55, respectively, with a source of current 26. Thus the heating current for each group of coils can be regulated separately and thereby the temperatures within the zones controlled by the groups adjusted individually and independently. The number of groups of coils, the cross section of their conductors, their vicinity to walls 39 and 18 can be made such that any desired degree and amount of heat can be conveyed to the mass passing the zone affected by the respective group of heating coils. Thereby any desired rule of heating and cooling the mass travelling through the confined space can be established, or the apparatus adapted to the treatment of various kinds of mixtures, the proper heat treatment of which according to the invention necessitates different degrees of heating.

Similar views apply to the portion of the confined space 17 surrounded by the cooling coils 33. Again the amount or velocity of the cooling medium and its temperature can be regulated so as to cool the mass passing through to room temperature or any desired higher temperature, e. g. just above or below a temperature corresponding to a transformation point of the mass. The cooling may be so intensive and instantaneous that the mass is quenched. The number of coils is to be chosen according to the desired effect, and also groups of coils can be formed passed by cooling media of different temperature and nature.

The space enclosed by heating coils 48 to 51 is tapered preferably over its entire length, as shown in Fig. 3, and the space enclosed by cooling coils 33 may be tapered to the same or different degree or even be cylindrical. Tapering of this part of the confined space is advisable because the mass passing that cooled space is shrinking somewhat, and such shrinkage should be taken care of in order to secure tight contact between the mass and the wall.

If the mass within the space enclosed by the heating coils is not solidified to an extent to produce the desired "back-pressure," the space surrounded by the cooling coils 33 has to be tapered over its entire length or part of it to such a degree that the travel of the mass solidified therein and forming a sort of "stopper" is obstructed sufficiently in order to create the desired amount of "back-pressure."

In Fig. 3 an additional zone of the confined space 17 is shown surrounded by heating coils 56 which are connected through cable 57 and rheostat 58 with a source of current 59 which may be the same as source 26. These heating coils 56 organize a heating zone through which the cooled mass travels and is heated again to a temperature at which tensions in the mass set up by the foregoing treatment, e. g. quenching, are removed and the mass is annealed or precipitation hardening is accomplished, if the proportions of the components of the mass are such that they dissolve each other to a higher degree at a temperature corresponding to their molten or semi-molten state than in their cooled solidified state. If a mass of such nature is treated in nozzle 16 a certain amount of components will dissolve or permeate each other, and this though unstable state can be maintained by sufficiently fast cooling (quenching). Upon annealing, however, the excess amount of components held in solid solution will be precipitated again, provided the annealing temperature remains considerably below melting or semi-melting temperature. If the melting or semi-melting temperature within nozzle 16 was between about 1100 C. and 1500° C., the annealing temperature (sometimes causing precipitation hardening) should be between about 350° C. and 900° C. By proper arrangement of heating coils 56 and adjustment of rheostat 58 any desired temperatures and rule of their increase and decrease, if desired, over the length of the zone enclosed by heating coils 56 can be accomplished.

The portion of space 17 enclosed by coils 56 may be cylindrical, or tapered towards the outer end, so as to produce any desired degree of pressure upon the portion of the mass passing through that zone. Any other shape of that zone can be brought about if e. g. a particular mechanical treatment of the mass passing it is desired.

Following that zone enclosed by heating coils 56, the end portion of tube 18 may be arranged in open air in order to cool again the mass which has passed the annealing zone, as shown in Fig. 3, or artificial cooling may be applied in a way similar to that by coils 33.

The horizontal cross section of the confined space 17 is not necessarily circular; it may also be oval over its entire length or part of it, if this is desirable for any reason; in particular, the upper end portion may be shaped thus that the mass or strand leaving confined space 17 is of a cross section different from that applied thereto by nozzle 16 or any other foregoing portion of channel 17. Thus the end portion of channel 17 within or subsequent to heating coils 56 can be made square, rectangular or of any other desired configuration.

Fig. 4 shows a rectangular cross section 60 of the upper end of channel 17 enclosed by wall 18. The cross section of the channel within heating coils 49 to 51, and/or cooling coils 33, and/or heating coils 56 however, may be circular, as shown by dotted lines 61 and may be, if desired, of even larger area than the rectangular cross section 6. If, however, a considerably reduced rectangular area is used, the tapering of the foregoing portions of channel 17 may either be omitted or be only such that differences in volume of portions of the mass due to different temperatures are taken care of; the reduction in cross section of the cooled mass extruded through the rectangular or other reduced cross section, will mostly be sufficient to create the desired "back-pressure" within nozzle 16. It is evident that by such reduction in cross section of the cooled mass in the last portion of channel 17, any desired mechanical working of the mass can be achieved. The cooled mass is compressed again and thereby desirable properties may be imparted to it, particularly if the reduction in area amounts to about 40% to 75%, or even more. It is also obvious that there should be no sudden change from the cylindrical or oval cross section of channel 17 to a rectangular or other one of reduced area, but that a gradual change from the beginning to the end of that last portion of the channel is preferable.

It is also evident that the last portion of the channel may be cylindrical and a mandrel 62 inserted into it, as shown schematically in Fig. 5, so that the mass extruded forms a tube. It is also understood that any other portion of channel 17 may be used for shaping the extruded mass differently from the shape applied to it by nozzle 16 by means, as shown by way of example in Figs. 4 and 5 with respect to the uppermost or outermost portion of channel 17.

It is understood that the invention is not limited to the exemplifications as to materials to be treated and designs of the apparatus shown in the drawings.

While the zones for locally heating successive portions of the mass to melting or semi-melting temperature, as well as for cooling them thereafter are relatively short, the following zones for heat treating and mechanically working, particularly shaping the mass or strand travelling therethrough are longer. They are shown relatively short in the drawings only to save space. Thus in particular, the annealing zone may be extended sufficiently to obtain the desired effect.

It must be taken into consideration that all the effects of heat treatments herein described depend upon the heat capacity of the portions of the mass under treatment and the speed of their travel through the respective zones. If any excessively long annealing zones would result, it is obvious that the process of the invention can be applied with all its advantages up to solidifying the mass by cooling, and that further heat treatments, such as annealing, can be performed in separate spaces, such as heating and/or cooling chambers.

It is also obvious that according to my invention a relatively long bar or slab is obtained being shaped in cross section, and bodies of smaller length than that of the extruded strand or bar can be obtained by further mechanical handling. Thus bodies of desired shape can be sliced from the bar or otherwise obtained. The bar can be cut into pieces and the pieces shaped further, if desired, particularly pressed, forged, drawn through dies into wires, etc.

It is also understood that when the extruded mass is to be shaped within the confined space, such as shown with reference to Figs. 4 and 5, it should preferably be kept at temperatures above room temperature which facilitates shaping of the mass and reduces the wear of wall 18 surrounding the shaping zone of space 17. However, the temperature of the mass should be considerably below any temperature at which it becomes plastic, or components of it flow, or its structure is materially changed for other reasons. The temperature should also be such that the desired obstruction to the travel of the mass in order to exert the necessary "back-pressure" is secured. Depending upon the composition of the mass, minimum temperatures within the shaping zones of the confined space between about 250° C. and 500° C. are suitable, and at any rate, on an average they should not be considerably higher than 30% to 50% of the semi-melting or melting temperature of the mixture or its component which is to be melted or semi-melted.

From the above description it appears that according to my invention a powdery mass comprising one or more elements, preferably two or more elements, is continuously moved through successive zones in which the mass is subjected to a combined heat and mechanical treatment. The zones of heat treatment comprise a first zone where the mass is locally and substantially instantaneously heated to melting or semi-melting temperature, an immediate subsequent second zone where the mass is solidified by cooling; in other subsequent zones the mass is either cooled down further and/or subjected to annealing. There may also be provided an additional zone before the first mentioned one in which the mass is pre-heated, if desired even to a temperature at which one or the other or all components start to flow, but in any case below high sintering temperature of the mass. The zones of mechanical treatment comprise as a first zone the space of an extrusion press where the powdery material is densified, a second zone in which the material is excessively reduced in area by extrusion, and a third zone in which the mass is reduced still further in area to an extent to exert a desired "back-pressure."

The first zone of mechanical treatment coincides substantially with the additional heating zone; the second zone of mechanical treatment coincides substantially with the first heating zone; and the third zone of mechanical treatment follows and may partly coincide with the second zone of heat treatment.

What I claim is:

1. A process of manufacturing solid and dense bodies of powdery mixtures of substantially metallic materials, comprising the steps of densifying the mixture in an extrusion press and extruding it into confined space, heating successive portions of the material locally and substantially instantaneously while passing from the press into the confined space to a temperature considerably exceeding high sintering temperature so as to cause substantial diffusion or solution in the mixture comprised by said portions, solidifying the thus heated portions immediately thereafter by cooling, and obstructing by reduction in area the onward travel of those solidified portions through said confined space so as to exert a high back-pressure upon the portions simultaneously undergoing extrusion and said local heating.

2. A process of manufacturing solid bodies of powdery mixtures of substantially metallic materials, comprising the steps of densifying the mixture in an extrusion press and extruding it through the outlet nozzle of the press into confined space, heating locally and substantially instantaneously successive portions of the material passing the nozzle to a temperature considerably exceeding high sintering temperature so as to cause substantial diffusion or solution in the mixture comprised by said portions, solidifying the thus heated portions immediately thereafter by cooling, and obstructing by reduction in area the onward travel of those solidified portions through the confined space so as to exert a high back-pressure upon the portions simultaneously passing the nozzle and being heated locally.

3. A process of manufacturing solid and dense bodies of powdery mixtures of substantially metallic materials, comprising the steps of densifying the mixture in an extrusion press and extruding it through the outlet nozzle of the press into confined space so as to obtain a considerable reduction in area, about 50% as a minimum, of the material while being extruded through the nozzle, heating locally and substantially instantaneously successive portions of the material while it passes the nozzle to a temperature ranging from semi-melting to and above melting temperature so as to cause substantial diffusion or solution in the mixture comprised by said portions, solidifying those portions immediately thereafter by cooling, and obstructing by reduction in area the onward travel of those solidified portions through the confined space so as to exert a high back-pressure upon the portions simultaneously extruded and heated locally in the nozzle and to increase the pressure upon the material still within the extrusion press.

4. A process of manufacturing solid and dense bodies of powdery mixtures of substantially metallic materials, comprising the steps of densifying the mixture while above room temperature but considerably below its semi-melting temperature in an extrusion press and extruding it into confined space, heating locally and substantially instantaneously successive portions of the material while undergoing extrusion from the press into the confined space to a temperature ranging from semi-melting to and above melting temperature so as to cause substantial diffusion or solution in the mixture comprised by said portions, solidifying immediately thereafter those portions within the confined space by cooling, and subjecting those solidified portions to considerable reduction in area while travelling onward through the confined space so as to exert a high back-pressure upon the portions just undergoing extrusion and said local heating.

5. In a process as described in claim 1, the additional step of applying a heat treatment to said solidified portions while travelling through the confined space.

6. In a process as described in claim 1, changing the cross-sectional configuration of said solidified portions while travelling through the confined space.

7. A process of manufacturing solid and dense bodies of powdery mixtures of substantially metallic materials, comprising the steps of densifying the mixture in an extrusion press and extruding it into confined space, heating locally and substantially instantaneously successive portions of the material while undergoing extrusion from the press into the confined space to a temperature ranging from semi-melting to and above melting temperature so as to cause substantial diffusion or solution in the mixture comprised by said portions, solidifying immediately thereafter those portions by cooling, considerably reducing in area those solidified portions while travelling onward through the confined space so as to exert a high back-pressure upon the portions simultaneously undergoing extrusion and said local heating, and subjecting those solidified portions while travelling still further through the confined space to a further heat treatment and shaping process, said heat treatment including further cooling and annealing and said shaping process resulting in a substantial change in configuration of the cross section of those portions.

8. A process of manufacturing alloys of at least two elements capable of being combined therein, such as steel alloys, magnetizable and hard metal alloys, comprising the steps of intimately and uniformly admixing the elements in finely divided state and desired proportion, densifying the mixture so obtained while substantially below semi-melting temperature of its elements in an extrusion press and extruding it into confined space, subjecting successive portions of the mixture while passing from the press into the confined space and while travelling through the latter to thermal treatment and reduction in area, said heat treatment being controlled so as to heat locally and substantially instantaneously the portions passing from the press into the confined space to a temperature ranging from semi-melting to and above melting temperature of at least one element of the mixture so as to cause substantial diffusion or solution therein and to solidify immediately thereafter that portion by cooling, said reduction in area comprising reducing considerably in area the portions passing from the press into the confined space and further reducing their area while travelling onward through the confined space so that a high back-pressure is exerted upon another portion simultaneously passing from the press into the confined space and undergoing said local heating.

9. In a process as described in claim 8, the step of compacting the initial powdery mixture into a preliminary coherent body before subjecting the mixture to high pressure in an extrusion press.

PAUL SCHWARZKOPF.